United States Patent
Josch et al.

(10) Patent No.: US 12,497,352 B2
(45) Date of Patent: Dec. 16, 2025

(54) PROCESS FOR PRODUCING ISOCYANATES

(71) Applicant: BASF SE, Ludwigshafen am Rhein (DE)

(72) Inventors: Jan Pablo Josch, Ludwigshafen am Rhein (DE); Matthias Hinrichs, Ludwigshafen am Rhein (DE); Jens Ferbitz, Ludwigshafen am Rhein (DE); Kai Thiele, Antwerp (BE); Torsten Mattke, Ludwigshafen am Rhein (DE); Stefan Maixner, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 477 days.

(21) Appl. No.: 18/023,747

(22) PCT Filed: Aug. 23, 2021

(86) PCT No.: PCT/EP2021/073238
§ 371 (c)(1),
(2) Date: Feb. 28, 2023

(87) PCT Pub. No.: WO2022/048930
PCT Pub. Date: Mar. 10, 2022

(65) Prior Publication Data
US 2023/0312462 A1   Oct. 5, 2023

(30) Foreign Application Priority Data
Sep. 1, 2020 (EP) ..................... 20193872

(51) Int. Cl.
*C07C 263/10* (2006.01)

(52) U.S. Cl.
CPC ................. *C07C 263/10* (2013.01)

(58) Field of Classification Search
CPC ... C07C 263/10; C07C 269/04; C07C 265/14; C07C 271/04
See application file for complete search history.

(56) References Cited

U.S. PATENT DOCUMENTS 3,960,916 A   6/1976  Fuchs et al.
6,576,788 B1  6/2003  Penzel et al.
2006/0252960 A1*  11/2006  Sohn ............... C07C 263/10
                                                    560/347
2011/0251425 A1  10/2011  Penzel et al.
2018/0179150 A1*  6/2018  Arras .............. C07C 263/10

FOREIGN PATENT DOCUMENTS

| CN | 101671275 A | 3/2010 | |
| EP | 1073628 A1 | 2/2001 | |
| WO | 99/54289 A1 | 10/1999 | |
| WO | WO-2004056756 A1 * | 7/2004 | ........... C07C 265/14 |
| WO | WO-2006130405 A2 * | 12/2006 | ......... C08G 18/7664 |
| WO | 2010/015667 A1 | 2/2010 | |
| WO | 2023/108620 A1 | 6/2023 | |

OTHER PUBLICATIONS

US Pub. 200602529660 english equivalent to WO 2004056756 (Year: 2004).*
European Search Report for EP Patent Application No. 20193872.7, Issued on Feb. 26, 2021, 3 pages.
International Preliminary Report on Patentability received for PCT Patent Application No. PCT/EP2021/073238, mailed on Mar. 16, 2023, 9 pages.
Six, et al., "Isocyanates, Organic", Ullmann's Encyclopedia of Industrial Chemistry, 7th Edition, vol. 20, Jan. 15, 2003, pp. 63-82.
International Search Report and Written Opinion received for PCT Patent Application No. PCT/EP2021/073238, mailed on Dec. 2, 2021, 11 pages.

* cited by examiner

*Primary Examiner* — Deborah D Carr
(74) *Attorney, Agent, or Firm* — Faegre Drinker Biddle & Reath LLP

(57) ABSTRACT

The invention relates to a process for producing isocyanates by reacting the corresponding amines with phosgene in the liquid phase, comprising: (a) mixing an amine comprising feed stream, a phosgene comprising feed stream and optionally an inert solvent; (b) reacting the amine with phosgene in a first reaction section to obtain an intermediate reaction mixture comprising isocyanate, carbamoyl chlorides, amine hydrochlorides and unreacted phosgene; (c) cleaving the carbamoyl chlorides and remove phosgene from the intermediate reaction mixture in a second reaction section to obtain an isocyanate comprising crude product, (d) optionally working-up the crude product; wherein reacting (b) is carried out such that the intermediate reaction mixture comprises 1.7 to 5 mol-% solid amine hydrochlorides based on the molar amount of amine fed into the process.

11 Claims, No Drawings

PROCESS FOR PRODUCING ISOCYANATES

CROSS-REFERENCE TO RELATED APPLICATIONS

This application is a National stage application (under 35 U.S.C. § 371) of PCT/EP2021/073238, filed Aug. 23, 2021, which claims benefit of European Application No. 20193872.7, filed Sep. 1, 2020, both of which are incorporated herein by reference in their entirety.

The invention relates on a process for producing isocyanates by reacting the corresponding amines with phosgene in the liquid phase by mixing an amine comprising feed stream, a phosgene comprising feed stream and optionally an inert medium and reacting the amine with phosgene in a reaction section forming an isocyanate comprising reaction mixture.

The preparation of isocyanates by phosgenation of the corresponding amines can in principle be effected by a liquid phase phosgenation or a gas phase phosgenation. Particularly for high boiling amines, phosgenation is carried out in the liquid phase. For the phosgenation in the liquid phase, the amine comprising feed stream is mixed with a liquid phosgene comprising feed stream and then the amine reacts with the phosgene forming the isocyanate.

The amine comprising feed stream may comprise the amine dissolved in a solvent. Further, it is known to react the amine with hydrogen chloride forming amine hydrochlorides in a pre-stage and suspending the amine hydrochlorides in a solvent, the thus obtained suspension being the amine comprising feed stream.

Processes for producing isocyanates by reacting the corresponding amines with phosgene in the liquid phase are well known to a skilled person and described for example in Isocyanates, Organic, Ullmann's Encyclopedia of Industrial Chemistry, 7th edition, Vol. 20, 2012, pages 63 to 82.

Particularly for producing polymeric methylenedi(phenylisocyanate) (PMDI) or tolylene diisocyanate (TDI) a liquid phosgene comprising feed stream and a liquid amine comprising feed stream are mixed. After mixing, the reaction immediately starts and besides the isocyanate carbamoyl chloride forms while hydrogen chloride splits off. The thus formed hydrogen chloride may react with amine forming amine hydrochlorides which may precipitate as solid particles.

It is well-known that non-reacted solid amine hydrochlorides at the end of the reaction section will cause yield loss by formation of ureas and follow-up products with the isocyanate. Therefore, a main goal of optimization is the minimization of solid amine hydrochlorides. This can be achieved by suitable mixing reducing the amount and size of the solids. This allows a complete conversion within the reasonable residence time inside the reaction section.

A process for producing PMDI in the liquid phase is described, for example, in WO-A 99/54289. For increasing the yield of isocyanates it is intended to reduce the amount of chlorinated by-products.

WO-A 2004/056756 discloses a process for producing polyisocyanates in which in a first reaction stage the amine is converted into amine hydrochloride and carbamoyl chloride, in a second stage the amine hydrochloride is converted into carbamoyl chloride and in a third reaction stage the carbamoyl chloride is split into the isocyanate and hydrogen chloride. The examples of WO-A 2004/056756 particularly relate on the formation of TDI and MDI (methylenedi(phenylisocyanate)).

A mixing device for mixing the amine comprising feed stream and the phosgene comprising feed stream which allows a quick mixing of the feed streams in a liquid phase phosgenation is disclosed for example in WO-A 2010/015667.

Surprisingly it has shown that minimizing the concentration of amine hydrochloride in the reaction mixture may have a detrimental effect on the total yield of isocyanates in the process.

Therefore, it was an object of the present invention to further optimize the yield of isocyanates in a process for producing isocyanates by reacting the corresponding amines with phosgene in the liquid phase.

This object was achieved by a process for producing isocyanates by reacting the corresponding amines with phosgene in the liquid phase, comprising:
(a) mixing an amine comprising feed stream, a phosgene comprising feed stream and optionally an inert solvent;
(b) reacting the amine with phosgene in a first reaction section to obtain an intermediate reaction mixture comprising isocyanate, carbamoyl chlorides, amine hydrochlorides and unreacted phosgene;
(c) cleaving the carbamoyl chlorides and remove phosgene from the intermediate reaction mixture in a second reaction section to obtain an isocyanate comprising crude product,
(d) optionally working-up the crude product;
wherein reacting (b) is carried out such that the intermediate reaction mixture comprises 1.7 to 5 mol-% solid amine hydrochlorides based on the molar amount of amine fed into the process.

By carrying out the reaction in such a way that the amount of solid amine hydrochloride in the intermediate reaction mixture which is withdrawn from the first reaction section is in the range from 1.7 to 5 mol-%, preferred of from 1.7 to 3.5 mol-%, more preferred of from 2.0 to 3.2 mol-% and particularly in a range of from 2.2 to 3.0 mol-% the yield of isocyanate is maximized. At lower concentrations of amine hydrochlorides as well as at higher concentrations of the amine hydrochlorides, the yield of isocyanates produced in the process decreases.

For producing the isocyanates in the liquid phase, the amine comprising feed stream and the phosgene comprising feed stream and optionally an inert medium are mixed and then react forming the isocyanate. Mixing and reacting thereby can be carried out in any suitable mixing and reacting device known to a skilled person and which is used in known processes for producing isocyanates in the liquid phase.

In the scope of the present invention, the first reaction section is operated in apparatuses which operate without fluid flowing in counterflow inside the apparatus. The second reaction section starts at the inlet of the first counterflow apparatus. A counterflow apparatus may be any apparatus in which a part of the contents flows in one direction and another part in the opposite direction in counterflow to the first part. Such a counterflow apparatus may be for example a column in which vapors flow upwards and liquid flows downwards like a reaction column or a distillation column.

Preferably, the first reaction section comprises two stages. If the first reaction section is carried out in at least two stages, in each stage the pressure is reduced. The first stage comprises a mixer for mixing the amine comprising feed stream and the phosgene comprising feed stream. The mixer preferably is a static mixer and particularly a nozzle. The pressure upstream of the nozzle is preferably from 3 to 70 bar, in particular from 15 to 45 bar. The pressure difference over the nozzle is at least 0.5 bar. The temperature in the first stage is preferably from 80 to 190° C., in particular from 90 to 150° C. The second stage comprises one or more residence apparatuses, preferably one residence apparatus, which is operated at a pressure of from 2.5 to 35 bar, preferably from 15 to 35 bar. Downstream of the nozzle, the reaction mixture is depressurized by means of a regulating valve or some other device suitable for this purpose to the pressure of the residence apparatus of the second stage. However, the natural pressure drop of the nozzle can also be used for the pressure reduction.

The reactor of the first stage of the first reaction section can also be integrated into the reactor of the second stage of the first reaction section. In particular, the mixing nozzle can dip into the gas phase or preferably into the liquid phase of the second reactor, i.e. can be located entirely or partly therein. It is also possible for the output from the nozzle to be conveyed by means of a pipe, an immersed tube or plug-in tube into the gas phase of preferably into the liquid phase of the reactor of the second stage.

The temperature in the second stage is from 80 to 190° C., preferably from 90 to 150° C. Possible types of reactors for the second stage of the first reaction section are tube reactors, stirred vessels, unstirred residence apparatuses, phase separation apparatuses and other apparatuses. The reactor can also be provided with a pumped circuit which may in turn have a heat exchanger for setting the reaction temperature. In the case of a stirred vessel, an unstirred residence apparatus or possibly also the case of a phase separation apparatus, the liquid phase is preferably depressurized under level control and the gas phase is depressurized under pressure control into the reactor of the second reaction section. However, the gas phase, which comprises mainly phosgene, hydrogen chloride and possibly solvent, can also be passed directly to the work-up, e.g. fractionation into phosgene, hydrogen chloride and solvent or into mixtures thereof. The residence reactor of the second stage of the first reaction section can, depending on the desired residence time and capacity of the plant, have relatively large dimensions and volumes, which can be regarded as disadvantages from the point of view of cost or safety, e.g. phosgene holdup at high-pressure. In this case, the reactor of the second stage of the first reaction section can be realized as two or more similar different reactors and types of reactor, which can be connected in parallel or, if appropriate to influence the residence time spectrum, also in series.

The reactor of the second reaction section preferably is operated at a pressure of from 2 to 20 bar, preferably from 3.5 to 16 bar. Downstream of the residence reactor of the second stage of the first reaction section, the reaction mixture is depressurized to the pressure of the reactor of the second reaction section by means of a regulating valve or some other device suitable for this purpose. A natural pressure drop may also be able to be utilized.

In any case, the pressure in the following stage, as described above, is selected so that it is lower than in the previous stage.

The temperature in the second reaction section is from 80 to 190° C. The reactor used for the second reaction section is a column, in particular a reaction column as described, for example, in WO 99/54289. The temperature at the bottom is from 80 to 190° C., and the temperature at the top is from 50 to 120° C. The column used as a reactor of the second reaction section can also be utilized for removing the excess phosgene from the reaction mixture. Like the reactor of the second stage of the first reaction section, the reactor of the second reaction section can be disadvantageously large. In this case, the second reaction section can also be realized as two or more similar or different columns connected in series.

The crude product is removed from the bottom of the last reaction column and preferably is worked up by customary methods to remove any phosgene still present and to separate off the solvent. In the case of the preparation of TDI, the crude TDI is subsequently subjected to removal of high boilers and purification by distillation. Phosgene, hydrogen chloride and possibly solvent can be separated off in a known manner from the vapor leaving the reaction column of the second reaction section and, if appropriate, the residence reactor of the second stage of the first reaction section can, if appropriate, be recirculated.

The inert solvent preferably is selected from chlorinated aromatic hydrocarbons such as dichlorobenzene, chlorobenzene, trichlorobenzene or mixtures thereof, aromatic or aliphatic hydrocarbons such as toluene, xylene, benzene, pentane, hexane, heptane, octane, cyclohexane, biphenyl, ketones such as 2-butanone, methyl isobutyl ketone, esters such as diethyl isophtalate, ethyl acetate, butyl acetate, nitriles such as acetonitrile and also sulfonlane.

The amine comprising feed stream either may be the amine in liquid form or preferably a solution comprising the amine dissolved in the inert solvent. If the amine is dissolved in the inert solvent, the amine concentration in the inert solvent is dependent on the amine used and on the solvent. In the case of diphenylmethanediamine (MDA) and/or polyphenylene-polymethylene polyamines (PMDA) or mixtures of these two, it can be 5 to 50% by weight, preferably 25 to 40% by weight; in the case of toluenediamine (TDA) or hexamethylenediamine (HDA) it can be 5 to 50% by weight, preferably 15 to 30% by weight; and in the case of isophoronediamine (IPDA) it can likewise be 5 to 50% by weight and preferably 15 to 30% by weight.

The phosgene comprising feed stream also either may be neat phosgene or phosgene solved in the inert solvent. If neat phosgene is used, the phosgene is in liquid form and mixed in (a) as a liquid in the liquid amine comprising feed stream. However, preferably, the phosgene is dissolved in inert solvent and the concentration in the inert solvent can be 10 to 98% by weight, preferably 50 to 95% by weight. The inert solvent used in the phosgene comprising feed stream preferably is the same as in the amine comprising feed stream.

If the first reaction section is carried out in two reaction stages, physical separation of the first and second stages is not absolutely necessary.

The reaction can be carried out at elevated temperature in all stages of the first and second reaction sections and if desired also isothermally.

If the reaction is carried out such that the first reaction section comprises only one stage, in the first reaction section the amine comprising feed stream and the phosgene comprising feed stream are mixed whereby the reaction starts and the intermediate reaction mixture is formed and the thus obtained intermediate reaction mixture is fed into a residence reactor, particularly a reaction column as described in WO-A 99/54289, of the second reaction section.

The temperatures and pressures employed are to some extend dependent on the amine used. Likewise, the phosgene excesses and residence times to be employed in the individual apparatuses are dependent on the amine used. In the case of methylenedi(phenylisocyanate) (MDI) and/or polymeric methylenedi(phenylisocyanate) (PMDI) or mixtures of these two, the excess of phosgene should be at least 100% of the stoichiometric amount, while in the case of tolylene diisocyanate (TDI) it should be at least 300% of the stoichiometric amount and in the case of hexamethylene diisocyanate (HDI) and isophorone diisocyanate (IPDI) it should likewise be at least 300% of the stoichiometric amount. The residence time in the first reaction stage of the first reaction section (static mixer) is usually very short and is defined by the apparatus design. The mean residence time in the residence apparatus of the second stage of the first reaction section can be from 1 second to 60 minutes. Preference is given to mean residence times of from 30 seconds to 30 minutes, particularly from 2 to 15 minutes. The mean residence time of the second reaction section (reaction column) is dependent on the number of theoretical plates, the height of the weir, the volume of liquid phase, the throughput through the column and other process engineering parameters. It is preferably not more than 1 hour.

According to the invention, the reaction is carried out in such a way that the intermediate reaction mixture which is withdrawn from the second reaction stage of the first reaction section comprises 1.7 to 5 mol-% amine hydrochlorides, preferred of from 1.7 to 3.5 mol-%, more preferred 2.0 to 3.5 mol-% and particularly 2.2 to 3.0 mol-%. The amine hydrochlorides usually are solid and formed during the reaction. The amount of amine hydrochlorides in the intermediate reaction mixture can be set by varying the process conditions like temperature, pressure, phosgene excess, solvent, amount of hydrogen chloride in the phosgene comprising feed stream and/or the mixing rate.

For controlling the amount of solid amine hydrochlorides in the intermediate reaction mixture, it is preferred to determine the amount of the solid amine hydrochlorides in the intermediate reaction mixture and if the amount is too low or too high, the process conditions are modified.

Determining the amount of solid amine hydrochlorides can be carried out by any method known to a skilled person. For continuously determining the amount of solid amine hydrochlorides, it is for example possible to withdraw a partial stream of the intermediate reaction mixture and to determine the amount of solids in the partial stream. For determining the amount of solid particles, the partial stream for example can be diluted with a solvent and the amount and size of the solid particles can be determined by a photographical method and automatized image evaluation. Besides this method also every suitable known particle counter can be used. The solvent used for diluting the partial stream particularly is the same solvent as used in the process for producing the isocyanate as inert solvent.

For adjusting the amount of solid amine hydrochlorides in the intermediate reaction mixture, for example the excess of phosgene fed into the reaction is controlled. If the amount of solid amine hydrochlorides is lower than a preset value, the excess of phosgene is reduced and if the amount of amine hydrochlorides is higher than the preset value the excess of phosgene is increased.

Alternatively or additionally, the amount of solid amine hydrochloride in the intermediate reaction mixture is adjusted by controlling the amount of inert solvent. In this case, if the amount of solid amine hydrochloride falls below the preset value, the amount of inert solvent is decreased and if the amount of solid hydrochloride is higher that a preset value, the amount of inert solvent is increased.

Further, the amount of solid amine hydrochloride in the intermediate reaction mixture also can be adjusted by selecting the inert solvent. If the reaction in the first reaction section is carried out such that the amount of amine hydrochloride is too low, an inert solvent is selected having a lower solubility for the amine than the solvent which is used when the amount of amine hydrochloride is below the preset value. Besides selecting an inert solvent having a lower solubility for the amine, if the amount of amine hydrochloride in the crude product is too low, it is also possible to reduce the mixing rate of the amine and the phosgene. Further, if the amount of solid amine hydrochloride is higher than a preset value, it is possible to select a solvent having a higher solubility for the amine or to increase the mixing rate. Usually the mixing rate can be adjusted for example by the type of the mixing nozzle or by the velocity of the amine comprising feed stream and the phosgene comprising feed stream. For adjusting the mixing rate, it is possible to use a dynamic mixer which allows a setting of the mixing time. Further, it is also possible to use mixing nozzles having adjustable nozzle openings which allow adjusting the mixing rate.

Since it is difficult or even impossible to change the solvent during the process or to change the mixing nozzle as long a mixing nozzle without adjustable nozzle openings is used, these measures for example can be taken if a process which already is in operation should be modified.

Besides the above mentioned measures for adjusting the amount of solid amine hydrochlorides in the intermediate reaction mixture or additionally to these measures, it is also possible to adjust the amount of solid amine hydrochlorides in the intermediate reaction mixture by controlling the temperature and/or by controlling the pressure. If the temperature is controlled for adjusting the amount of solid amine hydrochlorides, the temperature is reduced if the amount of solid amine hydrochlorides falls below a preset value and the temperature is increased if the amount of solid amine hydrochlorides is higher than the preset value. If the pressure is controlled for adjusting the amount of solid amine hydrochlorides, the pressure is increased if the amount of solid amine hydrochlorides falls below a preset value and the pressure is reduced if the amount of solid amine hydrochlorides is higher than the preset value.

A further possibility for adjusting the amount of solid amine hydrochlorides in the intermediate reaction mixture is controlling the amount of hydrogen chloride in the phosgene comprising feed stream. The content of hydrogen chloride in the phosgene comprising feed stream particularly results from recycling the phosgene after separation from the intermediate reaction product. The gaseous stream comprising phosgene and hydrogen chloride separated from the intermediate reaction product is further worked-up for separating the phosgene and hydrogen chloride. The phosgene comprising stream then is mixed with fresh phosgene and fed into the first reaction section as phosgene comprising feed stream. Since it is not possible to separate the phosgene without remainders of hydrogen chloride, hydrogen chloride also is fed into the reaction in with the phosgene comprising feed stream. By adjusting the separation conditions of the gaseous stream separated from the intermediate reaction product, the amount of hydrogen chloride in the phosgene comprising feed stream can be adjusted. For reducing the amount of solid amine hydrochlorides in the intermediate reaction product, the amount of hydrogen chloride in the phosgene comprising feed stream is increased.

Independent of the kind of adjusting the amount of solid amine hydrochlorides in the intermediate reaction mixture, the preset value thereby is a value in the range from 1.7 to 5 mol-%, preferred of from 1.7 to 3.5 mol-%, more preferred in the range from 2.0 to 3.2 mol-% and particularly in the range from 2.2 to 3.0 mol-%. Thereby it is possible that only one preset value is given or a first lower preset value and a second higher preset value wherein the amount of solid amine hydrochloride is adjusted in such a way that it remains in the range between the first lower preset value and the second higher preset value.

Each of the measures for adjusting the amount of solid amine hydrochlorides can be executed alone. Further, it is also possible, to use at least two of the measures for adjusting the amount of solid amine hydrochlorides in the intermediate reaction mixture. However, for ease of conduct, it is preferred to only use one of the measures.

EXAMPLES

Example 1

In a plant for producing TDI as described in WO-A 2004056756 with a tube reactor as residence time reactor as described in example 1 of the international application, a 19.5% solution of TDA in chlorobenzene is mixed with a 90% solution of phosgene in chlorobenzene in a mixing device as described in WO-A 2010/015667, the molar phosgene excess being 500%. The amount and size of solid particles in the intermediate reaction mixture withdrawn at the end of the reaction tube was determined by a photographical method and subsequent image evaluation. For this, a partial stream of the intermediate reaction mixture was withdrawn and diluted with chlorobenzene. The thus obtained mixture was fed through a cuvette for taking transmitted light photos.

The particle concentration in the intermediate reaction mixture determined by this process was 0.23% by volume which corresponds to a molar concentration of 2.7 mol-% based on the amount of TDA fed into the process. The loss in yield which was determined by the amount of TDI produced in the total process and the amount of TDA fed into the process was 3.01%.

Comparative Example 1

TDI was produced in the same way as described in example 1. However, a modified mixing nozzle was used by which the amount of amine hydrochloride in the intermediate reaction mixture could be reduced to 0.04% by volume, corresponding to 0.47 mol-% based on the amount of TDA fed into the process. Even though the amount of solid amine hydrochlorides was reduced, the loss in yield increased to 3.26%.

Example 2

MDI was produced by phosgenation of MDA in a 2-stage process according to WO-A 99/54289 (EP1073628 ?). Thereby 50 kg/h MDA are mixed with solvent chlorobenzene at a mass ratio chlorobenzene:MDA of 1.4. In a reaction mixing nozzle a phosgene containing feed (65% phosgene, 32% chlorobenzene, 3% HCl) is mixed with the amine containing feed. The reaction product is fed to a series of stirred vessels acting as residence time reactors and running at 100° C. and 5.5 bar, 4.5 bara, 2.8 bara and 2.5 bara respectively. Gas phase separated at each reactor and liquid phase from last reactor are fed to a distillation column operating at about 1.2 bara and a sump temperature of 172° C. to get a MDI-solvent mixture at the bottom. A partial stream of the liquid feed to the column is withdrawn, mixed with chlorobenzene and the size distribution and amount of solid particles was determined in a particle counter of Markus Klotz GmbH. Solvent is removed out of the sump product in a distillation to get a crude MDI product.

By carrying out the process in such a way, the amount of solid particles, particularly amine hydrochloride was 0.55% by volume, corresponding to 2.27 mol-% based on the amount of MDA fed into the process. The total yield was determined by the NCO-value of the crude MDI and was 32.1 g NCO/100 g.

Example 3

MDI was produced according to the process of Example 2 but the temperature of the second stirred tank reactor was set to 110° C. The solids concentration decreased on 0.35% by volume which corresponds to 1.7 mol-% based on the amount of MDA fed into the process. The NCO-value was 31.75 g/100 g.

Comparative Example 2

MDI was produced according to the process of Example 2 but the temperature of the second stirred tank reactor was set to 120° C. The solids concentration decreased on 0.2% by volume which corresponds to 1.0 mol-% based on the amount of MDA fed into the process. The NCO-value was 31.6 g/100 g.

Example 4

MDI was produced according to the process of Example 2 but the temperature of the second stirred tank reactor was set to 90° C. The solids concentration increased on 0.7% by volume which corresponds to 3.5 mol-% based on the amount of MDA fed into the process. The NCO-value was 31.74 g/100 g.

Comparative Example 3

MDI was produced according to the process of Example 2 but the amount of solvent was decreased to get a mass flow ratio of chlorobenzene to MDA of 1.0. The solids concentration increased on 1.05% by volume which corresponds to 5.1 mol-% based on amount of MDA fed into the process. The NCO-value was 31.54 g/100 g.

The invention claimed is:

1. A process for producing isocyanates by reacting the corresponding amines with phosgene in the liquid phase, comprising:
    (a) mixing an amine comprising feed stream, a phosgene comprising feed stream and optionally an inert solvent;
    (b) reacting the amine with phosgene in a first reaction section to obtain an intermediate reaction mixture comprising isocyanate, carbamoyl chlorides, amine hydrochlorides and unreacted phosgene;
    (c) cleaving the carbamoyl chlorides and remove phosgene from the intermediate reaction mixture in a second reaction section to obtain an isocyanate comprising crude product,
    (d) optionally working-up the crude product;
    wherein reacting (b) is carried out such that the intermediate reaction mixture comprises 1.7 to 5 mol-% solid amine hydrochlorides based on the molar amount of amine fed into the process.

2. The process according to claim 1, wherein the amount of amine hydrochlorides in the intermediate reaction mixture is adjusted by controlling the excess of phosgene fed into the reaction.

3. The process according to claim 1, wherein the amount of amine hydrochlorides in the intermediate reaction mixture is adjusted by controlling the amount of inert solvent.

4. The process according to claim 1, wherein the inert solvent is selected such that the solubility of the amine is reduced if the amount of solid amine hydrochlorides falls below a predetermined value and the solubility of the amine is increased if the amount of solid amine hydrochlorides rises above a predetermined value.

5. The process according to claim 1, wherein the amount of amine hydrochlorides in the intermediate reaction mixture is adjusted by controlling the temperature of the feed streams into the first reaction section and/or the reaction in the first reaction section.

6. The process according to claim 1, wherein the amount of amine hydrochloride in the intermediate reaction mixture is adjusted by controlling the amount of hydrogen chloride in the phosgene comprising feed stream.

7. The process according to claim 1, wherein the amount of amine hydrochloride in the intermediate reaction mixture is adjusted by controlling the mixing rate of the feed streams.

8. The process according to claim 1, wherein the amount of amine hydrochloride in the intermediate reaction mixture is adjusted by controlling the pressure during the reaction (b).

9. The process according to claim 1, wherein the amount of solid amine hydrochloride in the intermediate reaction mixture is determined by diluting a partial stream of the intermediate reaction mixture with solvent and counting the particles in the diluted partial stream.

10. The process according to claim 1, wherein the amine is diphenylmethanediamine (MDA), polyphenylene-polymethylene polyamine (PMDA), toluene diamine (TDA), hexamethylenediamine (HDA) or isophorone diamine (IPDA).

11. The process according to claim 1, wherein the first reaction section is operated in a residence time reactor.

* * * * *